United States Patent [19]

Kato et al.

[11] 4,277,426

[45] Jul. 7, 1981

[54] METHOD FOR PRODUCTION OF COAGULATED SYNTHETIC POLYMER LATEX

[75] Inventors: Shingi Kato, Takasago; Nobuo Ogawa; Norio Kawanami, both of Akashi; Takashi Onda, Takasago, all of Japan

[73] Assignee: Kanegafuchi Kagaku Kogyo Kabushiki Kaisha, Osaka, Japan

[21] Appl. No.: 97,895

[22] Filed: Nov. 27, 1979

[30] Foreign Application Priority Data

Aug. 20, 1979 [JP] Japan ................................ 54/106278

[51] Int. Cl.³ .............................................. B01J 2/04
[52] U.S. Cl. .......................................... 264/8; 264/13; 264/14
[58] Field of Search ................................ 264/8, 13, 14

[56] References Cited

U.S. PATENT DOCUMENTS

| 3,130,225 | 4/1964 | Friend | 264/14 |
| 4,028,447 | 6/1977 | Talbert | 264/8 |
| 4,190,622 | 2/1980 | Landis | 264/14 |

FOREIGN PATENT DOCUMENTS

| 94670 | 1/1960 | Netherlands | 264/13 |
| 1516476 | 7/1978 | United Kingdom . | |

*Primary Examiner*—Donald E. Czaja
*Assistant Examiner*—James R. Hall
*Attorney, Agent, or Firm*—Armstrong, Nikaido, Marmelstein & Kubovcik

[57] ABSTRACT

A method for coagulating a latex of a synthetic polymer having a coagulated latex particle formation temperature to form substantially spherical particles, the method comprising: forming substantially spherical latex particles by dispersing substantially spherical drops of the latex into a vessel or chamber containing a coagulating atmosphere which can be (i) a gaseous coagulant or (ii) a liquid coagulant in the form of a mist of drops having diameters such that the terminal settling velocity of the drops under free-falling conditions is in accordance with Stokes' Law, while maintaining the coagulant at the coagulated latex particle formation temperature and while causing water at the coagulated latex particle formation temperature to flow downward over the inner surface of the coagulation vessel to cause pluralities of polymer particles in a drop of the latex to coagulate to form substantially spherical coagulated latex particles. Contact is maintained between the spherical drops of latex and the coagulating atmosphere for a time effective to permit said drops to absorb about 0.36 to 8% by weight of coagulant based on the weight of the polymer, to stabilize said drops. The substantially spherical particles are separated and recovered.

6 Claims, 1 Drawing Figure

METHOD FOR PRODUCTION OF COAGULATED SYNTHETIC POLYMER LATEX

BACKGROUND OF THE INVENTION

In the prior art, recovery of high polymeric material as a solid resinous product from a high polymer latex produced a polymer powder mixed with particles of various sizes. The prior process involved coagulating the polymer latex by adding an aqueous solution of a suitable coagulating agent, such as inorganic salts, acids, and the like to the latex or, conversely, adding the latex to such aqueous solution and thereafter heating the coatulated latex to a suitable temperature. Then, resulting the coagulated latex was dehydrated and dried. However, it was inevitable that this prior process produced product comprising particles of irregular shapes, and the diameters thereof were difficult to regulate. The distribution of particle sizes was broad and the product contained large amounts of fine powder. This causes many problems, such as a large loss of product resulting from escape of the fine powder, frequent interruption of operation brought about by the plugging of passages by the fine powder, contamination of the environmental atmosphere of the operating room by the escape of the fine powder, and danger of explosion because of the emitted fine powder.

Furthermore, since it is impossible by the conventional method to obtain a polymer powder having large bulk density, expenses for packing, storing and transportation are high. Moreover, the coagulated latex produced by the conventional procedure is inferior in dehydrative properties, drying behavior, fluidity and anti-blocking. Thus, it has been necessary to provide expensive handling apparatus in all the steps following the coagulation.

In recent years, a variety of studies have been made on methods wherein a polymer latex is: (a) dispersed as fine drops into a coagulating atmosphere containing a gaseous coagulant or an aerosol spray of a liquid coagulant; (b) coagulated therein; and (c) then recovered as coagulated latex particles in substantially spherical and uniform shapes. Nevertheless, completely satisfactory results have not yet been obtained by prior art methods.

The present inventors have made a series of studies directed to a process for effectively producing substantially spherical coagulated latex particles over an extended period of time on an industrial scale. Said inventors have succeeded in providing a method for producing the desired superior coagulated latex particles more rationally and economically, in which spherical coagulated latex particles are obtained by passing drops of latex into a coagulating atmosphere in a coagulating chamber (or zone) while preventing: (a) the deposition of coagulated latex particles onto the interior surfaces of walls of said chamber, and (b) the destruction, as well as agglomeration, of the particles by allowing water, as a recovery medium, having a specific predetermined range of temperature, to flow downward on the interior surfaces of walls of said chamber while maintaining the coagulating atmosphere at the predetermined range of temperature.

SUMMARY OF THE INVENTION

An object of the present invention is to overcome the above-mentioned and other deficiencies of the prior art.

The present invention is directed to a process for the production of coagulated latex of synthetic polymer, said coagulated latex being capable of being recovered as a solid resinous powder. In said process, said polymer latex is dispersed to form liquid droplets having a droplet size distribution of not more than 20% by weight of fine drops with a diameter smaller than 53 microns and the remainder with a diameter of 2 millimeters or less into a coagulating chamber in which a coagulant-containing atmosphere (which can also be called a coagulating atmosphere) is contained. The coagulating atmosphere is controlled to maintain a temperature in the range of said coagulated latex particle formation temperature. Said coagulated latex particle formation temperature is the temperature range at which a plurality of coagulated latex particles adhere to each other to produce a single particle. The coagulating chamber has walls having inner surfaces with water, which serves as liquid recovery medium, flowing downward on said inner surfaces, said water being heated to said coagulated latex particle formation temperature.

The dispersed latex droplets, which become spherical as a result of their surface tension, come in contact with a gaseous coagulant or mist of coagulant solution and then coagulate. The coagulated latex particles are allowed, while travelling freely in the chamber, to absorb the coagulant in an amount in the range of from 0.36 to 8% by weight based on polymer before being collected in liquid recovery medium. The coagulated particles which have absorbed coagulant in such an amount are so firm that they are not destroyed even when arriving at the liquid recovery medium. Thereafter, the coagulated latex particles are collected in the liquid recovery medium, and subsequently separated therefrom as substantially spherical particles.

By flowing the liquid recovery medium downward over the inner surfaces of the walls of the coagulation chamber, the deposition of coagulated latex particles onto said surfaces is prevented. By further controlling the temperature of the liquid recovery medium and that of the coagulating atmosphere within the range characterizing the coagulated latex particle formation temperature in the present invention, the particles do not agglomerate as clusters of larger particles, even when the polymer latex is dispersed into the coagulating chamber at a high dispersion rate per unit area that cannot be attained without such agglomeration into clusters of larger particles outside said temperature range. Moreover, the coagulated latex particles are not destroyed upon arriving at the liquid recovery medium nor do they agglomerate with each other in the liquid recovery medium. The present invention enables simplification of the equipment for industrially producing a large quantity of coagulated latex particles as substantially spherical particles, which is highly economically advantageous.

The present invention provides a polymer powder comprising mostly substantially spherical particles whose diameters are selectively controlled to be within a particular range and, accordingly, the polymer powder obtained contains only a minimal amount of fine particles. The present invention encompasses the concurrent granulation and coagulation of the polymer latex in the gaseous phase. Said invention has been found to eliminate the aforementioned defects of the prior art. Therefore, the polymer products of the present invention are superior to prior art products in dehydrative properties, drying properties, fluidity and anti-blocking properties. The products of this invention also have a high bulk density. More specifically, the properties of the powder product result in advantages of reduced loss of product resulting from escape of fine powder, decrease in operational trouble brought about by the plugging of passages by fine powder, improved working environment because of decreased escape of fine powder into the environmental atmosphere and reduced danger of explosion due to the emitted fine powder. Not only that, but a decrease in expenditure required for dehydration and drying, reduced cost of utilities, decreased expenses in transportation, storage, insurance and the like are accomplished.

DETAILED DESCRIPTION OF THE PREFERRED EMBODIMENTS

Figure 1:
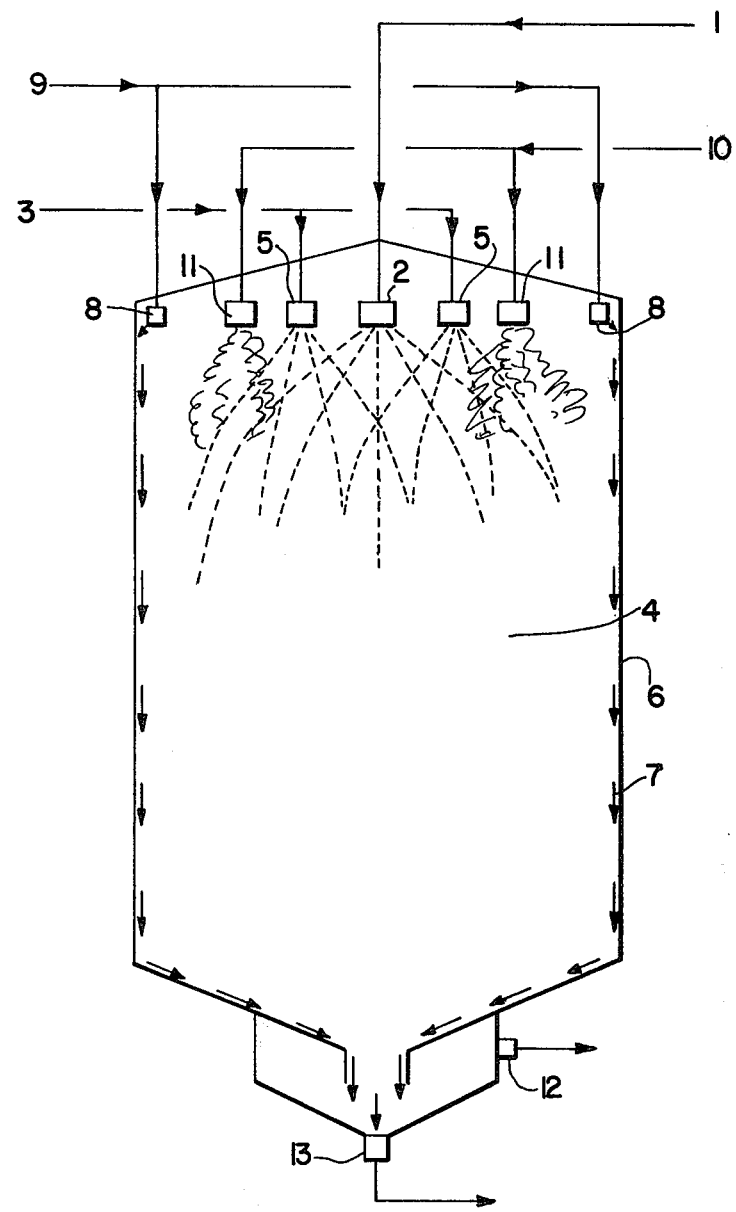
FIG. 1 depicts an illustrative embodiment of the present invention.

The present invention encompasses a method for production of a coagulated latex of synthetic polymer wherein the polymer is a thermoplastic polymer and is capable of being recovered as a solid resinous powder comprising the steps of:

(A) supplying into a coagulating chamber, which is surrounded with walls on the inner surfaces of which hot water elevated up to the range of the aforesaid coagulated latex particle formation temperature is allowed to flow downward to serve as a liquid recovery medium, a gaseous coagulant or a liquid coagulant in the form of a mist of fine droplets throughout said chamber, to form a coagulating atmosphere wherein the largest diameters of said fine droplets of liquid coagulant are such diameters that the terminal settling velocity of said fine droplets of liquid coagulant follows Stokes's Law at falling down freely in said chamber;

(B) maintaining a temperature in said coagulating atmosphere in the range of said coagulated latex particle formation temperature;

(C) dispersing said polymer latex into said coagulating atmosphere by a nozzle at a rate of 5.7 to 20 l/min.M$^2$ of horizontal cross-section of the coagulating chamber, or by a centrifugal disc at a rate of 0.5 to 2.0 l/min.M$^2$ of said cross-section to form liquid droplets which, because of their surface tension, have a substantially spherical shape, said droplets having a size distribution such that they are comprised of not more than 20% by weight of fine droplets with a diameter smaller than 53 microns, the remainder having a diameter of 2 millimeters or less;

(D) coagulating said droplets of polymer latex by contacting with said gaseous or liquid coagulant while travelling through said atmosphere, thus allowing the coagulated latex particles to absorb the coagulant in an amount of from 0.36 to 8% by weight based on the polymer to maintain substantially spherical configuration of said latex droplets upon recovery;

(E) allowing the resulting coagulated particles to enter a liquid recovery medium disposed at the side walls and the bottom of said chamber;

(F) recovering coagulated latex particles therefrom in the form of a substantially spherical configuration.

In order to produce spherical coagulated latex particles, the coagulated latex particles should have sufficient stiffness during the coagulation process to prevent their being destroyed by impact when hitting the recovery medium after travel through the coagulating atmosphere, and they should not agglomerate nor fuse after entering into the recovery medium nor during such travel. Various conditions have to be satisfied to meet these requirements. It is necessary to maintain the temperature of the coagulating atmosphere and the liquid recovery medium within the above-specified temperature range sufficient to obtain spherical particles under the above-recited dispersion rate of latex per unit area into the coagulating atmosphere to enhance productivity, when the present invention is put into practice on an industrial scale. The temperature range of the coagulating atmosphere is within the range of said coagulated latex particle formation temperature. In the case where the temperature of the coagulating atmosphere is lower, the coagulated latex particles are soft and, when latex dispersion rate per unit area is increased to raise productivity, latex droplets of larger diameters collide with those of smaller diameters due to the difference in falling velocities during falling. Thus, they agglomerate and form much larger coagulated particles. The coagulated particles obtained by agglomeration are destroyed by impact when hitting the liquid recovery medium, and thus co-mingle into the product as fine powder or broken powder in large quantities. Even if the coagulating atmosphere is kept at a low temperature, if the latex dispersion rate is not increased, collision or agglomeration of particles during travel rarely occurs, thereby resulting in a reduced quantity of fine or broken powder. Conversely, in the case where temperature of the coagulating atmosphere is higher than said coagulated latex particle formation temperature, the coagulated latex particles are subjected to heat-treatment before finishing coagulation, regardless of the high or low dispersion rate of latex, thus tending to make the interior of particles porous and thereby provide a polymer powder with reduced bulk density. Moreover, since the surface of the coagulated latex particles becomes soft owing to a high temperature, the coagulated latex particles agglomerate with each other, and thus the product powder contains a large amount of agglomerated particles, which is deleterious to powder properties such as bulk density, fluidity and the like.

The liquid recovery medium used to recover the coagulated latex particles and prevent deposition of the particles onto the walls is allowed to flow downward or on the surfaces of walls by means of (a) a ringed pipe having perforations opposing the walls, said ringed pipe being located at the upper end of inner side walls of the coagulating chamber; or (b) a plurality of flat spray nozzles. The flowing down of the recovery medium may also be carried out by a method wherein the recover medium is overflowed onto the inner walls of the chamber from the upper wall (top) of said chamber.

The temperature of the liquid recovery medium is an extremely important factor, as is the coagulating atmosphere mentioned above, as a condition for obtaining spherical particles effectively, and is preferably in the coagulated latex particle formation temperature range. In cases where the temperature of the liquid recovery medium is lower than the coagulated latex particles are destroyed as the coagulated latex particles and liquid recovery medium descend along the inner surface of the side wall of the coagulation chamber. This causes formation of large amounts of broken particles of coagulated latex and fine coagulated latex powder. Also, coagulated latex particle formation temperature cause softening of the coagulated latex particles, thereby leading to agglomeration or adhesion of the particles to undesirably increase the amount of larger particles. Still worse, the coagulated latex particles rise to the surface from slurry of the liquid recovery medium at the bottom of the coagulating chamber, thus preventing the flow of slurry, thereby making stable operation for a long period of time difficult.

It is inadequate to maintain the temperature of the coagulating atmosphere within the specified range by only heating the liquid recovery medium fed onto the inner surfaces of side walls of the coagulating chamber. Thus, hot air, steam or the like has to be supplied. In the formation of the coagulating atmosphere by changing a coagulant solution to mist, it is very convenient to employ steam as a dispersion medium because it serves both as a heat source to maintain the coagulating atmosphere at an elevated temperature and as a dispersion medium for the coagulant.

The gaseous coagulant used in the present invention may be any gas which is able to coagulate the said polymer latex. Typical examples are hydrogen chloride, carbon dioxide, fromic acid vapour and acetic acid vapour. They can be used solely or in admixture so long as they do not inter-react. Hydrogen chloride is most preferable since its coagulating ability is superior.

A gaseous coagulant, nonetheless, has a disadvantage in that it is more expensive than a liquid coagulant. As a coagulating mist to be used in the present invention, there is included a mist of a solution containing a compound capable of coagulating the liquid droplets of polymer latex (hereinafter the mist will sometimes be referred to as "coagulating mist").

Typical examples of the coagulating mist are an aqueous solution of inorganic salts such as sodium chloride, potassium chloride, lithium chloride, sodium bromide, potassium bromide, lithium bromide, potassium iodide, potassium sulphate, ammonium sulphate, sodium sulphate, ammonium chloride, sodium nitrate, potassium nitrate, calcium chloride, ferrous sulphate, magnesium sulphate, zinc sulphate, cupric sulphate, barium chloride, ferrous chloride, magnesium chloride, ferric chloride, ferric sulphate, aluminium sulphate, potassium alum or iron alum; aqueous solutions of inorganic acids such as hydrochloric acid, sulphuric acid, phosphoric acid or nitric acid, organic acids or their aqueous solutions such as acetic acid or formic acid, aqueous solutions of salts of organic acid such as sodium acetate, calcium acetate, sodium formate or calcium formate; methanol solutions of compounds such as sodium chloride, ammonium chloride, sodium bromide, potassium iodide, magnesium chloride, calcium chloride, barium chloride, magnesium sulphate, zinc sulphate, cupric sulphate, acetic acid or formic acid; ethanol solutions of sodium chloride and bromide, and potassium iodide, magnesium chloride, calcium chloride, ferric chloride, acetic acid and formic acid; alcohol solutions of inorganic salts exemplified above as the available compounds in ethanol solutions.

The foregoing can be used singly or in admixture. Among them, aqueous solutions of sodium chloride, potassium chloride, sodium sulphate, ammonium chloride, calcium chloride, magnesium chloride, magnesium sulphate, barium chloride, ferrous chloride, aluminium sulphate, potassium alum, iron alum, hydrochloric acid, sulphuric acid, phosphoric acid and acetic acid are preferred as coagulating mist.

The dispersing device of the liquid coagulant, such as a two-fluid nozzle, an ultra-sonic nozzle, a high pressure nozzle or a high frequency electric device may be disposed at the top of a coagulating chamber or at the upper inner side wall of the chamber. The diameters of fine droplets of coagulating mist are such diameters that the terminal settling velocity of the largest droplets of liquid coagulant follows Stokes's Law at falling down in the coagulating chamber by the force of its own gravity. The diameters of the fine droplets of the mist are such that no turbulent flow is generated when contacting the mist with latex droplets. Such fine droplets which follow Stokes's Law under such conditions and droplets which are smaller in diameter do not create a turbulant state when contacting with latex drops.

The polymer latex used in the present invention may comprise any polymer latex which is obtained by emulsion polymerization or by suspension polymerization, and which is a latex of a synthetic thermoplastic polymer. For example, the polymer latex may be a single polymer latex or a mixture of latexes obtained by the polymerization of copolymerization of one or more monomers selected from the following: aromatic vinyl compounds such as styrene, alpha-methylstyrene, cyanovinyl compounds such as acrylonitrile, methacrylonitrile, acrylic esters such as methyl acrylate, ethylacrylate, butyl acrylate, methacrylic esters such as methyl methacrylate, ethyl methacrylate, butyl methacrylate, acrylic acid, methacrylic acid, itaconic acid, maleic acid, butadiene, and cross-linking agents such as allyl methacrylate, diallyl phthalate, triallyl cyanurate, monoethylene glycol dimethacrylate, tetraethylene glycol dimethacrylate, divinyl benzene, glycidyl methacrylate. The above monomers are capable of polymerization by themselves or with each other.

The following polymer latexes are preferred, with the parts and percents herein being in terms of weight unless otherwise indicated.

A preferable polymer latex (hereinafter referred to as ABS polymer latex) is obtained by polymerization of 20 to 80 parts by weight of monomers consisting essentially of 0 to 50 weight percent acrylic ester, 0 to 100 weight percent methacrylic ester, 0 to 90 weight percent aromatic vinyl compound and 0 to 90 weight percent cyano vinyl compound in the presence of 20 to 80 parts by weight of an elastomer latex of butadiene series consisting essentially of 0 to 50 weight percent styrene and 50 to 100 weight percent butadiene, wherein said monomers are added as a single monomeric mixture or added one by one as two or three kinds of monomeric mixtures, in which Vicat softening temperature of the polymer is not higher than 100° C.

When ABS polymer latex is subjected to the present invention, the coagulated latex particle formation temperature is selected from the range between the Vicat softening temperature of polymer and 30° C. below the Vicat softening temperature. It is preferable to maintain the coagulating atmosphere at a temperature between the Vicat softening temperature of polymer and 20° C. below the Vicat softening temperature.

Another preferable polymer latex (hereinafter referred to as MUH polymer latex) is obtained by mixing 0 to 50 parts by weight of a graft copolymer (A) obtained by polymerization of 10 to 90 parts by weight of one or more monomers selected from the group consisting of an aromatic vinyl compound, a methacrylic ester, an acrylic ester or a cyano vinyl compound in the presence of 10 to 90 parts by weight of butadiene elastomer latex consisting of 0 to 50 weight percent of styrene and 50 to 100 weight percent of butadiene, and 50 to 100 parts by weight of a polymer (B) which is obtained by copolymerization of monomers containing 0 to 70 mol percent of α-methylstyrene and 30 to 100 mol percent of one or more monomers selected from the group consisting of an aromatic vinyl compound, a methacrylic ester, an acrylic ester, an acrylic acid or cyano vinyl compound, in which the Vicat softening temperature of the polymer is higher than 100° C.

In case where MUH polymer latex is supplied for the present invention, said coagulated latex particle formation temperature is chosen from the range between 70° C. and the Vicat softening temperature of polymer. It is preferred that the coagulating atmosphere is kept at a temperature between 80° C. and the Vicat softening temperature of polymer.

Vicat softening temperature herein referred to means the value obtained using one Kg load, which is described in ASTM D 1525-75.

The polymer latex is dispersed into a coagulating chamber containing a coagulating atmosphere by a dispersing device such as a high pressure nozzle, a two-fluid nozzle or a centrifugal disc.

The average dispersion rate of the polymer latex per unit horizontal cross section of the coagulating chamber can be increased up to 20 l/min. $M^2$ by a nozzle such as the high pressure nozzle and the two-fluid nozzle and the like, or else 2.0 l/min. $M^2$ by the centrifugal disc employed, provided that the temperatures of both the coagulating atmosphere and the recovery medium are kept within such an elevated range as aforesaid. In cases where the coagulating atmosphere and/or the recovery medium are outside that range, the maximum dispersion rate is to 5.7 l/min. $M^2$, or 0.5 l/min. $M^2$, respectively. As is apparent from the foregoing, the present invention increases the efficiency of the productivity 3.5 to 4-fold (i.e., the efficiency as measured by rate of throughput is increased 3.5 to 4 times).

The coagulant causes the liquid droplets of the polymer latex to coagulate and maintain their natural nearly spherical shape caused by the action of the surface tension of the droplets.

The droplets of polymer latex used in the present invention comprise not more than 20 weight percent of fine droplets with diameters smaller than 53 microns, and the remainder having diameters which are 2 millimeters or less. If more than 20 weight percent of fine droplets having diameters smaller than 53 microns, powder properties are deteriorated, for example, such particles have decreased bulk density, degraded fluidity, increased dusty fine powder or the like, which result is avoided in the present invention. In the case of particles of more than 2 millimeters, since such large coagulated particles have a large inertia, the spherical particles are destroyed or deformed due to collision with the liquid recovery medium upon recovery. This makes it difficult to recover spherical particles.

It is necessary that the coagulated latex particles absorb the coagulant in an amount effective for preventing the coagulated latex particles from being destroyed by impact upon entering the liquid recovery medium.

Such amount is at least 0.36 weight percent based on polymer weight and a practical upper limit is 8 weight percent. Even though the amount absorbed is more than 8 weight percent, no change can be observed in stiffness of the coagulated latex particles. Hence, it is economically disadvantageous (because of the cost of coagulant), for the particles to absorb more than 8% of coagulant when the invention is practiced on an industrial scale. Accordingly, the amount of coagulant absorbed by the coagulated latex particles just before entering the liquid recovery medium ranges about from 0.36 to 8 weight percent based on polymer. In order to cause the coagulated latex particles to absorb the coagulant in this amount, it is important to suitably select the amount of coagulant supplied to form the coagulating atmosphere and to control the retention time of latex droplets in the coagulating atmosphere. The feed rate of coagulant varies depending upon the feed rate of polymer latex and the minimum amount is about 0.4 weight percent based on the polymer.

The retention period of the latex droplets in the coagulating atmosphere (i.e., the period extending from the time of emission from the dispersing device to the time of entering the liquid recovery medium) ranges from about 0.6 to 3 seconds, based on the drops having the largest diameter amoung the dispersed latex droplets. The lower limit of the amount of coagulant supplied to the coagulating atmosphere and the retention time of the latex droplets in the coagulating atmosphere have a close bearing on the sufficiency of absorbed coagulant in order to afford stiffness to the coagulated latex particles, because of which the coagulated latex particles are not destroyed by impact upon entering the liquid recovery medium. On the other hand, the upper limit is a rather practical and economical one when carrying out the invention on an industrial scale. When the coagulant is supplied in an amount of 10 weight percent based on the polymer fed into the coagulating atmosphere, the amount of coagulant absorbed by the coagulated latex particles makes the coagulated latex particles tough. Thus, they are not destroyed or deformed by impact upon recovery. The supply of coagulant exceeding the foregoing amount results in loss of coagulant and thus is not recommended, because there is no need to stiffen the coagulated latex particles greater than required to avoid breakage and, further, it results in decrease in absorption efficiency of the coagulant by the coagulated latex particles. The upper limit of the retention time of the coagulated latex particles in the atmosphere is also based on economic considerations. If the retention time is increased, larger equipment is required. Thus, productivity is decreased. When spherical particles are produced in accordance with the present invention, an upper limit in the retention period of three seconds is sufficient for the largest latex droplets; a longer retention period requires larger equipment, which is economically disadvantageous.

The accompanying drawing shows an illustrative embodiment of the present invention. Referring to FIG. 1, there is shown a dispersing device 2 disposed at the top of a coagulating chamber 6, for dispersing a polymer latex supplied from source 1 as liquid droplets having diameters within the range of droplet size distribution of not more than 20 weight percent of fine droplets with a diameter smaller than 53 microns and the remainder with a diameter of 2 millimeters or less, and having a definite mean value. The dispersing device 2 may be a single nozzle or multiple nozzles of the high pressure or low pressure type, or a centrifugal disc or other suitable means. The device 2 may also be disposed on the side wall of the chamber 6. At the top of the coagulating chamber 6 is a coagulant charging device 5 disposed for supplying a coagulant to the chamber 6 to form coagulating atmosphere 4, thereby causing coagulating of the liquid droplets of polymer latex dispersed by the dispersing device 2. Coagulating gas or mist of coagulant solution is supplied to the device 5 by supply source 3. The coagulant is supplied to the chamber 6 to cause coagulating of the liquid droplets of polymer latex during travel of the liquid droplets downward through the coagulating atmosphere 4 from the dispersing device 2 until they reach the liquid recovery medium 7, from which the coagulated latex particles are recovered. The device 5 may also be located on the upper side wall of the chamber 6. The recovery medium 7 supplied from source 9 is introduced by a recovery medium supplying device 8 positioned at the top of the chamber 6, and flows downward as a thin liquid film onto the inner surfaces of walls of the chamber 6, then removed from a recovery medium exit 13 outside of coagulating chamber. Disposed toward the top of the chamber 6 is a gas inlet 11 for supplying fresh gas from source 10 having a controlled temperature to maintain the temperature of the coagulating atmosphere at a specified range of the coagulated latex particle formation temperature.

When the coagulant solution is changed to mist to form coagulating atmosphere, it is possible to modify the equipment by supplying steam from source 10 and incorporating gas inlet 11 into the coagulant charging device 5. This process also produces advantages in that the steam supplied functions both as a dispersion medium of coagulant and as a heat source for maintaining the temperature of coagulating atmosphere within the specified range of temperature. Disposed at the bottom of the chamber 6 is a gas exit 12 for removing gas from coagulating atmosphere 4.

The present invention will be hereinafter further illustrated by way of the following examples:

EXAMPLE 1

A polymer latex having a concentration and Vicat softening temperature of the polymer of 30 weight percent and 75° C., respectively, and being maintained at 30° C., was produced by graft polymerization of a mixture of monomers comprising styrene and methyl methacrylate to a copolymer of styrene and butadiene- 35% styrene, 20% methyl methacrylate and 45% butadiene. This latex was sprayed at the rate of 20 l/min. through 8 hollow cone nozzles, each having an orifice diameter of 2 millimeters under spraying pressure of 7.3 kg/cm$^2$G, into a cylindrical coagulating chamber 9 meters high and 1.5 meter in diameter. Hot water maintained at 46° C. was directed in a downward flow on the inner surfaces of the coagulating chamber at a rate of 2.5 m$^3$/hr. The hot water entered the chamber through side spray nozzles located at the upper inner walls and being collected at the bottom of the chamber to serve as a recovery medium. Into the coagulating chamber, a 23 weight percent hydrochloric acid aqueous solution maintained at 15° C. was dispersed as fine droplets of 100 microns or less through two-fluid nozzles of an inside mixing type having an orifice diameter of 2 millimeters. The HCl solution was dispersed at a rate of 0.65 kg/min, using steam at 0.6 kg/cm$^2$G, thereby forming a coagulating atmosphere at a controlled temperature of 45° to 47° C. and at atmospheric pressure. A gaseous stream was released at the rate of 150 NM$^3$/hr from a gas exit provided at the bottom of the chamber. The dispersed latex drops had about 260 microns mean diameter with the largest diameter being 1 millimeter. The terminal velocity of the latex drops having 1 millimeter diameter at falling down was 4.3 meter/sec. and Reynolds number was 240, being in the region of laminar flow.

The retention time of the largest diameter latex drops in the coagulating atmosphere was about 1.5 sec. The dispersion rate of latex into the chamber per unit area of the horizontal cross section of the chamber was 11.3 l/min M$^2$.

Coagulated latex particles were captured at the bottom of the chamber before entering the liquid recovery medium and an amount of coagulant absorbed by the particles was measured. The coagulated latex particles absorbed the coagulant in an amount of 2.1 weight percent based on the weight of the polymer. The dispersed latex drops were brought into contact with the coagulant while travelling through the chamber, coagulated, collected in the liquid recovery medium, and then removed as slurry from the chamber.

The coagulated latex particles in the slurry thus obtained retained substantially spherical shapes, containing substantially no broken or agglomerated particles. No turbidity of the liquid recovery medium resulting from dissolution of uncoagulated latex could be observed. After heat treatment of the coagulated particles at 80° C. for 10 minutes, dehydration and drying were carried out. The thus obtained polymer particles were substantially spherical independent particles having a good fluidity and an angle of repose of 28.8°. the bulk density of the particles was as much as 0.450 g/cc and the particle size distribution was very sharp, i.e., the content of the particles having the diameters within the range of 105 microns to 500 microns was 86 weight percent and the content of the particles having diameters smaller than 53 microns was only 5.5 weight percent. The results of powder properties measured are tabulated in Table 1.

EXAMPLE 2

An experiment was carried out under the similar conditions to Example 1, with the exception that the steam pressure for dispersing the coagulant was set at 1.2 kg/cm$^2$G and the temperature of coagulating atmosphere was controlled within the range of 56° to 59° C.

The slurry taken out of the chamber was subjected to heat-treatment at 80° C. for 10 minutes, then to dehydration and drying. The polymer particles thus obtained comprised almost all spherical particles which were superior in powder properties, and contained destroyed or agglomerated particles in lesser amounts than in Example 1. The observed powder properties are shown in Table 1.

EXAMPLE 3

An experiment was performed under condition similar to those of Example 1, excepting that 72° C. hot water was fed as a liquid recovery medium, 2.0 kg/cm$^2$G steam was used for dispersing the coagulant and steam in a small amount was fed to control the coagulating atmosphere within 72° to 75° C.

The coagulated latex particles in the slurry removed from the chamber contained almost no broken or agglomerated particles, retained a substantially spherical shape. Turbidity in the slurry could not be observed. The coagulated latex particles were heat-treated for 80° C. for 10 minutes, then dehydrated and dried. The resultant polymer particles were superior in powder properties, to such a degree as those obtained in Example 2.

The obtained results on the powder properties are provided in Table 1.

EXAMPLE 4

An experiment was carried out under the similar conditions to Example 1, with the exception that the polymer latex was sprayed at the rate of 10 l/Min. through 4 hollow cone nozzles, each having an orifice diameter of 2 millimeters. The latex dispersion rate per unit area of the horizontal cross section of the chamber was 5.7 l/Min. M².

The slurry taken out of the chamber was subjected to heat-treatment at 80° C. for 10 minutes, then to dehydration and drying. The polymer particles thus obtained comprised almost all spherical particles which were superior in powder properties, and contained destroyed or agglomerated particles in lesser amounts than in Example 1. The observed powder properties are shown in Table 1.

COMPARATIVE EXAMPLE 1

An experiment was conducted in a similar manner and under similar conditions to those of Example 1, with the exception that the polymer latex was sprayed at the rate of 10 l/Min. through 4 hollow cone nozzles, each having an orifice diameter of 2 millimeters, the coagulant was dispersed using air having 1.4 kg/cm²G, 48° C. hot water was fed as a liquid recovery medium and steam was supplied into the coagulating chamber to maintain the coagulating atmosphere within 30° to 35° C. The destroyed or agglomerated coagulated particles amounted to about half of the total coagulated particles in a slurry removed from the chamber, and made the slurry turbid. Even after heat-treatment of the slurry at 80° C. for 10 minutes, whitish turbidity did not disappear and dehydration was very much inferior. The polymer particles obtained after drying contained broken or agglomerated particles in much greater quantities as compared with cases in Example 1 or Example 2, and had such inferior properties as low bulk density, inferior antiblocking and fluidity. The results observed on the powder properties are given in Table 1.

COMPARATIVE EXAMPLE 2

An experiment was conducted in a similar manner and under similar conditions to those of Comparative Example 1, with the exception that 55° C. hot water was fed as a liquid recovery medium and steam was supplied into the coagulating chamber to maintain the coagulating atmosphere within 40° to 43° C. The considerable amount of the destroyed or agglomerated coagulated particles were contained in the slurry removed from the chamber, and made the slurry turbid. After heat-treatment of the slurry at 80° C. for 10 minutes, whitish turbidity disappeared but dehydration was not so good. The polymer particles obtained after drying had good powder properties as compared with those of obtained in Comparative Example 1, but they were not successful. The results observed on the powder properties are given in Table 1.

COMPARATIVE EXAMPLE 3

The polymer latex used in Example 1 was dispersed at the rate of 5 l/min through two hollow cone nozzles used in Example 1 into the coagulating chamber where the coagulating atmosphere was formed under the same conditions as in Comparative Example 1 and then coagulated. In the coagulated latex particles in the slurry taken out from the chamber, substantially no broken or agglomerated particles were contained and nearly all the particles were spherical. No whitish turbidity in slurry could be observed. The polymer particles produced after heat-treatment at 80° C. for 10 minutes, dehydration and drying had substantially spherical shapes and showed the superior powder properties which were nearly equal to those obtained in Example 1.

In the coagulating conditions in Comparative Example 3, however, about 10 weight percent of coagulant based on polymer weight, amounting to the four times the amount of coagulant employed in Example 1 and Example 2 were used. Further, the latex dispersion rate per unit area of the horizontal cross section of the chamber was as low as 2.8 l/Min. M². Such conditions cause productivity problems when put into practice on an industrial scale.

COMPARATIVE EXAMPLE 4

The polymer latex was coagulated and recovered as polymer particles in conditions similar to those of Example 1, with the exception that 68° C. hot water was fed as a liquid recovery medium, 2.0 kg/cm G steam was used as a dispersing medium for the coagulant and a small quantity of steam was fed to maintain the coagulating atmosphere within 80° to 83° C.

In the coagulated latex particles in slurry removed from the chamber, there were contained no destroyed particles but a large quantity of agglomerated particles. The polymer particles obtained by heat-treatment of slurry at 80° C. for 10 minutes, dehydration and drying, contained agglomerated particles amounting to half their amount or more. The polymer particles showed inferior properties, such as low bulk density and inferior fluidity, as compared with those in Example 3. The observed results on the powder properties are in Table 1.

EXAMPLE 5

An experiment was performed under the similar conditions to Example 1, with the exception that the polymer latex was sprayed at the rate of 35 l/Min. through 14 hollow cone nozzles, each having an orifice diameter of 2 millimeters, a 23 weight percent hydrochloric acid aqueous solution was supplied at the rate of 1.3 kg/Min, 65° C. hot water was fed as a liquid recovery medium and the coagulating atmosphere was maintained within 60 to 65° C. In the coagulating conditions in Example 5, indeed, about 20 l/Min. M². of dispersion rate of the latex into the chamber, dispersing to about four times the dispersion rate employed in Comparative Example 1. In the coagulated latex particles in the slurry taken out from the chamber, substantially no broken or agglomerated particles were contained and nearly all the particles were spherical. No whitish turbidity in slurry could be observed. The polymer particles produced after heat-treatment at 80° C. for 10 minutes, dehydration and drying had substantially spherical shapes and showed the superior powder properties which were nearly equal to those obtained in Example 2.

COMPARATIVE EXAMPLE 5

The polymer latex was coagulated and the coagulated polymer particles were recovered under conditions similar to those of Example 5, with the exception that the polymer latex was sprayed at the rate of 50 l/Min. through 20 hollow cone nozzles, each having an orifice diameter of 2 millimeters and a 23 weight percent hydrochloric acid aqueous solution was supplied at the rate of 2.0 kg/min.

In the coagulation conditions in Comparative Example 5, the latex dispersion rate per unit area of the horizontal cross section of the chamber was about 28 1/Min. M².

The destroyed coagulated particles caused the slurry removed from the chamber turbid. Even after heat-treatment of the slurry at 80° C. for 10 minutes, whitish turbidity did not disappear and dehydration was very much inferior. The polymer particles obtained after drying contained broken or agglomerated particles in much greater quantities as compared with cases in Example 1 or Example 5.

The results observed on the powder properties are given in Table 1.

COMPARATIVE EXAMPLE 6

The polymer latex was coagulated and the coagulated polymer particles were recovered under conditions similar to those of Example 1, with the exception that 39° C. hot water was fed as a liquid recovery medium, 0.8 kg/cm²G steam was used for dispersion of the coagulant and the coagulating atmosphere was maintained within 45° to 48° C.

The coagulated latex particles thus obtained contained almost no agglomerated particles, but a considerably larger quantity of broken particles, which made the slurry turbid with white broken powder. The slurry was then subjected to heat-treatment at 80° C. for 10 minutes, but whitish turbidity remained and dehydration was exceedingly poor. The polymer particles so obtained contained a much greater quantity of broken particles and fine powder as compared with those produced in Example 1 or Example 2, and the powder properties were inferior. The powder properties measured are shown in Table 1.

COMPARATIVE EXAMPLE 7

With the exception that 80° C. hot water was fed as a liquid recovery medium, the coagulant was dispersed using 2.0 kg/cm²G steam, and the coagulating atmosphere was maintained within 72° to 75° C., an experiment was carried out under conditions similar to those in Example 1.

For some time after the beginning of the dispersion of latex, a slurry containing a large amount of agglomerated coagulated perticles was removed constantly from the recovery medium exit at the bottom of the chamber, but the discharge flow of the slurry from the chamber became gradually intermittent, then the removal of slurry stopped after about one hour. Further operation was impossible. When inner sides of the chamber were observed after stopping the operation, it was found that the coagulated latex particles had deposited one centimeter thick onto the inside surfaces of the walls and the recovery medium exit at the bottom was blocked by the agglomerated coagulated latex particles.

EXAMPLE 6

A polymer latex whose concentration and Vicat softening temperature were 30 weight percent and 85° C., respectively, and maintained at 30° C., was prepared by graft polymerization of a monomeric mixture comprising styrene and methyl methacrylate to a copolymer of styrene and butadiene, comprising 35% styrene, 30% methyl methacrylate and 35% butadiene. The latex was sprayed at the rate of 20 1/min. through the 8 hollow cone nozzles used in Example 1 under the same conditions as those of Example 1 into the same coagulating chamber as in Example 1.

As the liquid recovery medium, hot water maintained at 70° C. was fed downward at the rate of 2.5 M³/hr through side spray nozzles positioned at the upper inner walls of the chamber onto the inside surfaces of walls. Into the chamber, hydrogen chloride gas maintained at 15° C. was supplied at the range of 15.5 1/min. and, further, a small amount of steam was fed to control the temperature of the coagulating atmosphere within 65° to 70° C. at ambient pressure, and exhaust gas was released at the rate of 150 NM³/hr through the gas exit placed at the bottom of the chamber.

In such conditions, the amount of coagulant used was 0.4 weight percent based on the polymer weight. The coagulated latex particles were taken out before entering the liquid recovery medium at the bottom of the chamber and the amount of coagulant absorbed by the particles was measured. Coagulant in an amount of 0.36 weight percent was absorbed based on polymer weight. The dispersed latex drops absorbed the coagulant while travelling through the chamber, then after coagulation were collected in the liquid recovery medium, and were thereafter taken out as slurry from the chamber.

There were almost no destroyed or agglomerated particles in the coagulated latex particles in the slurry removed from the chamber and the particles retained nearly spherical shapes. Turbidity of the liquid recovery medium due to the presence of uncoagulated latex was not observed. The slurry was heat-treated at 85° C. for 10 minutes, dehydrated and dried. The thus obtained polymer particles were nearly spherical and independent, and showed superior powder properties. The results observed on the powder properties are shown in Table 1.

COMPARATIVE EXAMPLE 8

An experiment was carried out similarly to Example 6, with the exception that hydrogen chloride gas was fed at the rate of 10 1/min. and the amount of coagulant employed was 0.26 weight percent based on polymer weight.

For some time after the beginning of the dispersion of latex, the recovery medium, free of turbidity and containing the coagulated latex particles in substantially spherical shapes, was removed through the recovery medium exit at the bottom of the chamber. A few minutes later, the recovery medium began to become turbid owing to solution of uncoagulated particles, and broken particles appeared therein a great amount. The slurry was subjected to heat-treatment at 85° C. for 10 minutes but the turbidity did not disappear, and thus dehydration was very inferior. Therefore, it was understood that the conditions were not suitable at all for industrialization.

When 10 minutes passed after the beginning of the dispersion of latex, the coagulated latex particles were taken out before entering the liquid recovery medium and the amount of coagulant absorbed by particles was measured. An amount of 0.24 weight percent based on polymer weight were absorbed.

EXAMPLE 7

Coagulation and recovery were carried out under similar conditions to Comparative Example 7, with the exception that a 23 weight percent hydrochloric acid aqueous solution was supplied at the rate of 2.6 kg/min., and the same polymer latex as used in Example 6 was dispersed. The coagulated latex particles were removed before entrance into the liquid recovery medium at the bottom of the chamber to measure the amount of coagulant absorbed by the coagulated particles. An amount of 7.9 weight percent based on polymer weight were absorbed.

Operation was continuously carried out for 5 hours and the coagulated latex particles in the slurry removed from the chamber contained no destroyed or agglomerated particles, and the particles were nearly spherical in shape. No turbidity of the slurry could be observed. After continuous operation, deposition of polymer resin onto the inner surfaces of walls could not be seen.

The polymer particles obtained by heat-treatment of the slurry at 85° C. for 10 minutes, dehydration and drying had powder properties as superior as those of Example 2 or Example 3. The observed results on powder properties are given in Table 1.

COMPARATIVE EXAMPLE 9

The experiment was performed under conditions similar to those of Example 7, with the exception that a 35 weight percent hydrochloric acid aqueous solution was dispersed as a coagulant at the rate of 2.6 kg/min. The coagulated latex particles before entering the recovery medium were taken out for measurement of the amount of the coagulant absorbed by the particles. An amount of 11 weight percent of the coagulant was absorbed based on the polymer weight. The amount of coagulant used based on resin was 15.2 weight percent of polymer, compared with 10 weight percent based on polymer in Example 7.

The removed slurry was heat-treated at 85° C. for 10 minutes, dehydrated and dried. The polymer particles so obtained showed superior powder properties, which were equal to those obtained in Example 7. It was understood that even though the amount of coagulant was increased up to that used in Comparative Example 9, no effects on the powder properties could be observed. Rather, such an increased amount was meaningless and not desired with respect to economics.

EXAMPLE 8

The polymer latex was coagulated and the polymer particles were recovered under conditions similar to those of Example 7, with the exception that the polymer latex was dispersed into the chamber through a perforated plate having 0.5 mm diameter holes at the rate of 18 l/min. at 1 kg/cm²G, and a 23 weight percent hydrochloric acid aqueous solution was fed at the rate of 1.9 kg/min. as a coagulant. The latex drops dispersed in the chamber ranged from 0.4 to 2 millimeters in diameter, having a 1 millimeter mean diameter.

In the coagulated latex particles in the slurry removed from the chamber, there were no broken, agglomerated or deformed particles and the nearly all particles were substantially spherical. Turbidity of the slurry was not observed.

Under the above conditions, the amount of coagulant used was 8 weight percent based on the polymer and the retention time in the coagulating atmosphere of the latex drops having a 2 millimeter diameter was calculated as about 1.2 seconds.

COMPARATIVE EXAMPLE 10

An experiment was conducted under conditions similar to those of Example 8, with the exception that the polymer latex was dispersed through a perforated plate with holes having 0.7 millimeter diameter at a rate of 20 l/min. at 1 kg/cm². The latex drops dispersed in the coagulating atmosphere had diameters ranging from 0.4 to 3 millimeters, and about 1.4 millimeter mean diameter.

Slurry removed from the chamber became turbid and a great number of broken particles were present. The largest unbroken particles contained in the slurry were 2.5 millimeters in diameter, and the particles ranging from 2 to 2.5 millimeters comprised perfectly spherical particles and hemispheric particles. The retention time in the coagulating atmosphere of the largest coagulated particles (2.5 millimeters in diameter) which were recovered in the perfectly spherical shapes was calculated as about 1 second.

EXAMPLE 9

An experiment was conducted similarly to Example 2, excepting that a coagulating chamber having 1.5 meter diameter and 5 meter height was employed.

The coagulated latex particles in the slurry removed from the chamber were nearly spherical and the slurry was not turbid. The slurry was subjected to heat-treatment at 80° C. for 10 minutes, then dehydration and drying. The thus obtained polymer particles showed good powder properties, comparable to those obtained in Example 2. The powder properties measured are shown in Table 1. Under these conditions, the largest latex drops had a 1 millimeter diameter and the retention time thereof in the coagulating atmosphere was calculated as about 0.6 second.

COMPARATIVE EXAMPLE 11

An experiment was carried out under similar conditions to those of Example 2, with the exception that a coagulating chamber having 1.5 meter diameter and 3.5 meter height was used.

The slurry removed from the chamber became turbid because uncoagulated particles were dissolved in the slurry. The slurry was heat-treated at 80° C. for 10 minutes, but turbidity remained and dehydration was very poor. These conditions were not suitable for the industrialization of the process.

The latex drops dispersed under these conditions contained 1 millimeter particles in the largest diameter and the retention time thereof in the coagulating atmosphere was calculated as 0.35 second.

EXAMPLE 10

The polymer latex used in Example 2 was sprayed at the rate of 18 l/min. through 8 hollow cone nozzles having an orifice diameter of 1.8 millimeters under spraying pressure of 12.2 kg/cm²G into a cylindrical coagulating chamber having dimensions of 8 meters in height and 1.5 meter in diameter.

As a liquid recovery medium, hot water was fed downward onto the inner surfaces of walls of the chamber using the same conditions as in Example 2. A 33 weight percent mixed aqueous solution containing calcium chloride and phosphoric acid was sprayed at the rate of 0.85 kg/min. through the same two-fluid nozzles as used in Example 2 under the same conditions as in Example 2, then the polymer latex was subjected to coagulation.

The latex drops had a mean diameter of about 180 microns and the largest diameter was 0.5 millimeter. The terminal velocity of 0.5 millimeter latex drops was 2.2 m/sec. and the Reynolds number was 60, being kept in conditions of laminar flow. The retention time of the largest latex drops in coagulating atmosphere was calculated as about 3 seconds. The coagulated latex particles in the slurry removed from the chamber contained substantially no broken or agglomerated particles. The particles had nearly spherical shape; thus, the slurry was not made turbid. The polymer particles obtained by heat-treatment of the slurry at 80° C. for 10 minutes, dehydration and drying were nearly spherical and independent and were superior in powder properties. In Table 1, the results on the powder properties are given.

COMPARATIVE EXAMPLE 12

The polymer latex was coagulated and recovered under conditions similar to those of Example 10, with the exception that a coagulating chamber having a 1.5 meter diameter and a 9 meter height was employed.

Under these conditions, the retention time of the latex drops having the largest diameter (0.5 millimeter) in the coagulating atmosphere was about 3.4 seconds. The slurry removed from the chamber was subjected to heat-treatment at 80° C. for 10 minutes, dehydration and drying. The resulting polymer particles had the same powder properties as those in Example 10, which showed that the increased height of the chamber produced no effects on the powder properties.

EXAMPLE 11

A mixed polymer latex having a concentration of 30 weight percent and Vicat softening temperature of 105° C. and being controlled at 30° C. was produced by mixing 33 weight percent of a graft polymer latex (A) obtained by graft polymerization of a mixture of monomers comprising styrene, acrylonitrile and methyl methacrylate in the presence of butadiene elastomer latex, having 60 wt. % butadiene, 10 wt. % methyl methacrylate, 10 wt. % acrylonitrile and 20 wt. % styrene, and 67 weight percent of a homocopolymer latex (B) comprising 20 wt. % alpha-methylstyrene, 25 wt. % acrylonitrile and 55 wt. % styrene. The obtained polymer latex was sprayed at the rate of 25.5 l/min. through 9 hollow cone nozzles of a pressure type, each having an orifice diameter of 2.5 millimeters under spraying pressure of 6.1 Kg/cm$^2$G, into a cylindrical coagulating chamber having dimensions of 9 meters in height and 1.5 meter in diameter. On the inner surfaces of the walls of the coagulating chamber, hot water maintained at 72° C. was allowed to flow downward at the rate of 2.5 M$^3$/hr just like a thin film through side spray nozzles positioned at the upper inner walls to serve as a recovery medium. Into the coagulating chamber, a 30 weight percent calcium chloride aqueous solution maintained at about 15° C. was dispersed as fine droplets of 100 microns or less through two fluid nozzles of an inside mixing type having an orifice diameter of 2 millimeters at the rate of 1.1 Kg/min, using steam maintained at 1.2 Kg/cm$^2$G. The coagulating atmosphere was maintained at 70° to 76° C. by directly supplying a small amount of steam into the chamber and was at atmospheric pressure. A gaseous stream was released at the rate of 150 NM$^3$/hr from a gas exit located at the bottom of the chamber. The dispersed latex drops had about 290 microns mean diameter with the largest diameter of 1.2 millimeters. The terminal velocity of the latex drops having 1.2 millimeters diameter at falling down was 5.2 meters/sec. and Reynolds number was 350 which was in the region of laminar flow.

The retention time of the largest diameter latex drops in the coagulating atmosphere was about 1.3 seconds. The mean dispersion rate of latex into the chamber was 14.4 l/min.M$^2$ per a unit horizontal cross area of the chamber. The coagulated latex particles before entering the liquid recovery medium were captured at the bottom of the chamber and an amount of coagulant absorbed by the particles was measured. The coagulated latex particles absorbed the coagulant in an amount of 3.4 weight percent based on the weight of the polymer. The dispersed latex drops were brought into contact with the coagulant while travelling through the chamber, coagulated, collected in the liquid recovery medium, and then removed as slurry from the chamber.

The coagulated latex particles in the slurry thus obtained retained substantially spherical shapes, containing substantially no broken or agglomerated particles. No turbidity of the liquid recovery medium resulting from dissolution of uncoagulated latex could be observed. The coagulated particles were then heat-treated at 98° C. for 10 minutes, dehydrated and dried. The obtained polymer particles were substantially spherical independent particles having a good fluidity and an angle of repose of 28.9°. The content of the particles having diameters ranging from 105 microns to 500 microns was 83 weight percent and the content of the fine particles having diameters smaller than 53 microns was only 11.2 weight percent. Dustiness of powder indicating the degree of dustiness due to scattering of fine powders was only 0.31 percent. The powder properties observed are given in Table 1.

EXAMPLE 12

An experiment was performed in a similar manner and under similar conditions to those of Example 11, excepting that hot water maintained at 75° C. was allowed to flow downward to serve as the recovery medium on the inside surfaces of the walls of the chamber, the steam pressure for dispersing the coagulant was set at 2.0 Kg/cm$^2$G and the coagulating atmosphere was maintained at 81° to 86° C.

The slurry removed from the chamber was heat-treated at 98° C. for 10 minutes, then dehydrated and dried. The obtained polymer particles comprised almost all spherical particles having superior powder properties, and contained destroyed or agglomerated particles in lesser amounts than those in Example 11. The observed powder particles are shown in Table 1.

EXAMPLE 13

The polymer latex was coagulated and recovered under similar conditions to those in Example 11, with the exception that 95° C. hot water was fed as a recovery medium, the steam pressure for the dispersion of the coagulant was 2.0 Kg/cm$^2$G, no steam supplied directly into the chamber was employed, a released amount of a gaseous stream was reduced by adjusting a valve of a gas exit at the bottom of the chamber, and the coagulating atmosphere was controlled within 84° to 90° C.

After heat-treatment of slurry taken out from the chamber at 98° C. for 10 minutes, dehydration and drying were followed. The polymer particles so obtained were substantially spherical particles having superior powder properties and the dustiness of powder was by far superior as compared with that in Example 12.

COMPARATIVE EXAMPLE 13

The polymer latex was coagulated and recovered under the similar conditions to those in Example 11, with the exception that no steam was introduced directly into the coagulating chamber and the temperature of the coagulating atmosphere was maintained between 58° to 62° C.

The coagulated latex particles in slurry removed from the coagulating chamber contained agglomerated or destroyed particles amounting to approximately half their amount, which made the slurry turbid with white broken powder. The slurry was subjected to heat-treatment at 98° C. for 10 minutes. Whitish turbidity disappeared but dehydration was very poor. The obtained polymer particles contained a much greater quantity of fine powder as well as broken or agglomerated particles, as compared with those obtained in Example 11 to Example 13. The polymer particles had an inferior fluidity and were exceedingly dusty. The observed powder properties are tabulated in Table 1.

COMPARATIVE EXAMPLE 14

The polymer latex was coagulated and recovered under the similar conditions to those in Comparative Example 13, excepting that a 30 weight percent calcium chloride aqueous solution maintained at about 15° C. was dispersed as the coagulant at the rate of 0.5 Kg/min., the same polymer latex as used in Example 11 was sprayed at the rate of 5 l/min. through 2 hollow cone nozzles, each having an orifice diameter of 2 millimeters under spraying pressure of 7.3 Kg/cm$^2$G, into a coagulating chamber.

The coagulated latex particles in slurry contained substantially no broken or agglomerated particles, retaining substantially spherical particles. The slurry was not turbid.

The slurry was then subjected to the heat-treatment at 98° C. for 10 minutes, dehydration and drying. The so obtained particles comprised substantially spherical and independent particles and had superior powder properties nearly ranking with those in Example 11. However, in the coagulating conditions of Comparative Example 14 the dispersion rate of the polymer latex into the coagulating chamber was as low as 2.8 l/min. M$^2$ per a unit horizontal cross area, which raised the problem of low productivity for an industrial scale operation. Moreover, a great quantity of about 10 weight percent of coagulant per resin amounting to twice the amount of coagulant used in Example 11 to Example 13 was not desired with respect to economics.

COMPARATIVE EXAMPLE 15

An experiment under the similar conditions to those in Example 11 was carried out, with the exception that hot water maintained at 60° C. was flowed downward to serve as the recovery medium on the inside surfaces of the wall of the chamber, the pressure of steam for dispersion of coagulant was set at 2.0 Kg/cm$^2$G and a small amount of steam was directly fed into the coagulating chamber to control the coagulating atmosphere at 70° to 75° C.

The coagulated latex particles in slurry removed from the coagulating chamber contained substantially no agglomerated particles but a considerable amount of broken particles, with which the slurry was made turbid. The slurry was heat-treated at 98° C. for 10 minutes. Whitish turbidity disappeared but dehydration was very inferior.

The thus obtained polymer particles contained much greater amounts of destroyed particles and fine powders as compared with those produced in Example 11 to Example 13, and had inferior powder properties, in dustiness in particular. The powder properties measured are shown in Table 1.

EXAMPLE 14

The polymer latex was coagulated and recovered under the similar conditions to those in Example 11, with exception that a specified amount of steam and air were supplied directly and constantly into the coagulating chamber, the pressure in the coagulating chamber was maintained at 1.9 to 2.0 Kg/cm$^2$G by adjusting a valve of a gas exit at the bottom of the chamber, hot water maintained at 105° C. was allowed to flow downward to serve as the recovery medium on the inside surfaces of the walls of the chamber, steam pressure for the dispersion of coagulant was controlled at 3.8 Kg/cm$^2$G, the temperature of the coagulating atmosphere was maintained at 100° to 105° C., and the polymer latex was sprayed into the coagulating chamber under the spraying pressure of 8.1 Kg/cm$^2$G while maintaining the slurry level at a specified height by the adjustment of a valve of a slurry exit at the bottom of the chamber.

The coagulated latex particles in slurry taken out from the coagulating chamber were nearly all spherical, containing no broken or agglomerated particles, and turbidity of slurry was not observed.

The so obtained slurry was heat-treated at 105° C. for 10 minutes in an auto-clave, then dehydrated and dried. The polymer particles obtained had superior powder properties and antidustiness which coped with those obtained in Example 12 or Example 13. The powder properties are given in Table 1.

COMPARATIVE EXAMPLE 16

A similar experiment to that in Example 14 was conducted excepting that a quantity of steam fed directly into the coagulating chamber was increased to maintain the temperature of the coagulating atmosphere at 114° to 120° C.

In the coagulated latex particles in slurry removed from the chamber there were contained no broken particles but a large quantity of agglomerated particles.

The slurry was subjected to the heat-treatment at 105° C. for 10 minutes in an auto-clave, thereafter dehydrated and dried. The polymer particles thus obtained contained agglomerated particles amounting to their half amount or more and showed inferior properties such as low bulk density and inferior fluidity, as compared with those in Example 14. The observed powder properties are shown in Table 1.

COMPARATIVE EXAMPLE 17

The polymer latex was coagulated and recovered under similar conditions to those in Example 14, with exception that on the inside surfaces of the walls of the chamber was hot water maintained at 117° C. allowed to flow downward to serve as the recovery medium, a quantity of steam supplied directly into the chamber was decreased as compared with that in Example 14.

Shortly after the beginning of spraying of latex, the content of the coagulated latex particles contained in slurry removed from the chamber began to decrease rapidly, then the coagulated latex particles did not come to exit. After operation stopped, it was observed that the recovery medium exit placed at the bottom of the chamber was blocked with agglomerated particles.

EXAMPLE 15

A mixed polymer latex having a concentration of 30 weight percent and Vicat softening temperature of 135° C. and being maintained at 30° C. was prepared by mixing 30 weight percent of a graft polymer latex (A) obtained by graft polymerization of a mixture of monomers comprising styrene and acrylonitrile in the presence of butadiene elastomer latex, having 65 wt. % butadiene, 10 wt. % acrylonitrile and 25 wt. % styrene, and 70 weight percent of a homocopolymer latex (B) comprising 70 wt. % alpha-methylstyrene, 10 wt. % methyl methacrylate and 20 wt. % acrylonitrile.

The polymer latex so prepared was coagulated and recovered under the same conditions as in Comparative Example 17.

The operation was carried out continuously for 7 hours. The coagulated latex particles in slurry removed from the chamber contained nearly no broken or agglomerated particles and were nearly spherical. No turbidity of the slurry was observed. Even after the operation, deposition of resin onto the inside surfaces of the walls of the chamber was not observed.

The so obtained slurry was heat-treated at 120° C. for 10 minutes in an auto-clave, then dehydrated and dried. The polymer particles showed almost the same superior powder properties as those in Example 12 or Example 13, as shown in Table 1.

EXAMPLE 16

An experiment was effected using the same apparatus under the same conditions as in Example 13, with the exception that a 30 weight percent calcium chloride aqueous solution maintained at about 15° C. was dispersed at the rate of 2.5 Kg/min. to serve as the coagulant.

The coagulated latex particles were removed before entrance into the recovery medium at the bottom of the chamber and the amount of coagulant absorbed by the coagulated particles was measured. An amount of 7.6 weight percent based on polymer were absorbed.

The coagulated latex particles in slurry taken out from the chamber contained almost no destroyed or agglomerated particles and retained substantially spherical shapes. The slurry was not turbid at all.

The slurry was subjected to heat-treatment at 98° C. for 10 minutes, then dehydration and drying followed. The resulting polymer particles showed powder properties as superior as those in Example 13, as given in Table 1.

COMPARATIVE EXAMPLE 18

The polymer latex was coagulated and recovered in the same apparatus and conditions as those in Example 16, with the exception that a 35 weight percent calcium chloride aqueous solution maintained at about 15° C. was dispersed at the rate of 3 Kg/min. to serve as the coagulant.

Before entrance into the recovery medium the coagulated latex particles were collected to measure an amount of coagulant absorbed. The coagulated latex particles absorbed an amount of 10 weight percent based on polymer.

While the amount of coagulant used was 10 weight percent based on polymer in Example 16, in Comparative Example 18, an amount of 13.7 weight percent was employed.

After heat-treatment of the slurry removed from the chamber at 98° C. for 10 minutes, dehydration and drying were carried out. The obtained polymer particles had powder properties as superior as those in Example 16. Hence, it was apparent that even though the amount of coagulant was increased to that used in the present Comparative Example 18, no effects on the powder properties could be observed. Rather, such an increased amount was meaningless and not desired with respect to economics in the production on an industrial scale.

EXAMPLE 17

A similar experiment was carried out under the same conditions as in Example 13, excepting that hydrogen chloride gas maintained at about 15° C. was introduced at the 20 l/min. to serve as the coagulant, and further the temperature of the coagulating atmosphere was maintained at the same temperature as in Example 13 by feeding steam directly into the coagulating chamber.

Under these conditions the amount of coagulant used was 0.4 weight percent based on polymer and the coagulated latex particles collected before entrance into the recovery medium absorbed an amount of 0.36 weight percent based on polymer.

In the coagulated latex particles in slurry removed from the chamber, there were contained almost no destroyed or agglomerated particles. The coagulated latex particles were substantially spherical in shape, and turbidity of the recovery medium owing to solution of uncoagulated latex was not observed.

The slurry was subjected to heat-treatment at 98° C. for 10 minutes, dehydration and drying. The polymer particles comprized almost spherical and independent particles and the powder properties thereof were satisfactorily superior, as shown in Table 1.

COMPARATIVE EXAMPLE 19

An experiment was performed under the same conditions as in Example 17, excepting that hydrogen chloride gas as the coagulant was fed at the rate of 15 l/min. and an amount of coagulant used was 0.3 weight percent based on polymer.

For some time after the beginning of the dispersion of latex, unturbid recovery medium containing nearly spherical coagulated latex particles was removed from the chamber. A few minutes later, however, the recovery medium began to become turbid, thereafter turbid and whitish recovery medium due to solution of uncoagulated particles and broken particles appeared therein in great amounts. The slurry was subjected to heat-treatment at 98° C. for 10 minutes but the turbidity did not disappear, and thus dehydration was very inferior, which was not suitable at all for industrialization.

When 10 minutes passed after the beginning of the dispersion of latex, the coagulated latex particles were taken out before entering the recovery medium to measure an amount of coagulant absorbed by particles. An amount of 0.28 weight percent based on polymer was absorbed.

EXAMPLE 18

With the exception that the polymer latex was sprayed at the rate of 18 l/min. through a perforated plate having 0.5 mm diameter holes under the spraying pressure of 1 Kg/cm$^2$G and a 23 weight percent hydrochloric acid aqueous solution was dispersed at the rate of 1.9 Kg/min. to serve as the coagulant, the polymer latex was coagulated and recovered under the same conditiones as in Example 13. The latex drops dispersed in the chamber ranged from 0.4 to 2 millimeters in diameter, having a 1 millimeter mean diameter.

In the coagulated latex particles in the slurry discharged from the chamber, there were contained no destroyed, agglomerated or deformed particles and nearly all particles were substantially spherical in shape. Whitish turbidity of the slurry was not seen.

Under the above conditions, the amount of coagulant used was 8 weight percent based on polymer and the retention time in the coagulating atmosphere of the latex drops having a 2 millimeter diameter was calculated as about 1.2 seconds.

COMPARATIVE EXAMPLE 20

The same experiment as in Example 18 was conducted, excepting that the polymer latex was sprayed at the rate of 20 l/min. through a perforated plate having 0.7 mm diameter holes under the spraying pressure of 1 $Kg/cm^2G$.

The latex drops dispersed in the chamber had the range of from 0.4 to 3 millimeters in diameter, having a 1.4 mm mean diameter.

The slurry discharged from the chamber was made turbid owing to a great amount of destroyed particles contained therein. The largest unbroken particles contained in the slurry had a 2.5 mm diameter. The coagulated particles having diameters ranging from 2 to 2.5 millimeters comprized perfectly spherical particles and hemispheric particles. The retention time in the coagulating atmosphere of the largest particles having a 2.5 mm diameter which were recovered in the perfectly spherical shape was calculated as about 1 second.

EXAMPLE 19

The same polymer latex as used in Example 13 was sprayed through 8 hollow cone nozzles, each having an orifice diameter of 2 millimeters, at the rate of 20 l/min. under the spraying pressure of 7.3 $Kg/cm^2G$ into a cylindrical coagulating chamber having dimensions of 5 meters in height and 1.5 meters in diameter.

With the exception that hot water was flowed downward like a thin film to serve as the recovery medium on the inside surfaces of the walls of the chamber, under the same conditions as in Example 13, and a 23 weight percent hydrochloric acid aqueous solution was dispersed at the rate of 0.65 Kg/min., the polymer latex was treated under the same conditions as in Example 13. The dispersed latex drops had approximately 260 microns mean diameter with the largest diameter of 1 millimeter. The terminal velocity of the latex drops having 1 millimeter diameter at falling down was 4.3 meters/sec. and Reynolds number was 240, being in the region of laminar flow. The retention time of the largest diameter latex drops in the coagulating atmosphere was calculated as about 0.6 second.

The coagulated latex particles in slurry discharged from the chamber contained substantially no broken or agglomerated particles and were nearly spherical in shape. Turbidity of the slurry resulting from solution of uncoagulated latex was not observed.

The slurry was heat-treated at 98° C. for 10 minutes, then dehydrated and dried. The so obtained polymer particles showed the powder properties as superior as those in Example 11. The observed powder properties are provided in Table 1.

COMPARATIVE EXAMPLE 21

The polymer latex was coagulated and recovered under the same manner as in Example 19, with the exception that a coagulating chamber having dimensions of 3.5 meters in height and 1.5 meters in diameter was employed.

The slurry removed from the chamber was made turbid due to solution of uncoagulated particles and a great amount of broken particles. The slurry was heat-treated at 98° C. for 10 minutes. Whitish turbidity of the slurry disappeared but dehydration was very inferior, which was not suitable for industrialization. The retention time in the coagulating atmosphere of the dispersed latex drops having the largest diameter of 1 millimeter was calculated as about 0.35 second.

EXAMPLE 20

The polymer latex was coagulated and recovered under the same conditions as in Example 19, excepting that the same polymer latex as used in Example 19 was sprayed through 8 hollow cone nozzles, each having an orifice diameter of 1.8 millimeters at the rate of 18 l/min. under the spraying pressure of 12.2 $Kg/cm^2G$ into a cylindrical coagulating chamber having dimensions of 8 meters in height and 1.5 meters in diameter. The dispersed latex drops had about 180 microns mean diameter with the largest diameter of 0.5 millimeter. The terminal velocity of the latex drops having 0.5 millimeter diameter at falling down was 2.2 m/sec. and Reynolds number was 60, being in the region of laminar flow.

The retention time of the largest diameter latex drops in the coagulating atmosphere was calculated as about 3 seconds. The coagulated latex particles in slurry discharged from the chamber contained hardly any destroyed or agglomerated particles and retained nearly spherical shapes. The recovery medium was not made turbid at all. The slurry was subjected to heat-treatment at 98° C. for 10 minutes, thereafter dehydration and drying. The polymer particles so obtained were substantially spherical in shape and independent on each other, and showed superior powder properties. The observed powder properties are provided in Table 1.

COMPARATIVE EXAMPLE 22

With the exception that a coagulating chamber having dimensions of 9 meters in height and 1.5 meters in diameter was employed, the similar experiment was effected to that of Example 20. The retention time in the coagulating atmosphere of the latex drops having the largest diameter of 0.5 millimeter was calculated as about 3.4 seconds.

After heat-treatment at 98° C. for 10 minutes of the slurry removed from the chamber, it was dehydrated and dried. The resulting polymer particles had the powder properties as superior as those of Example 20, which meant that such an increased height of the coagulating chamber did not produce any effect on the powder properties.

TABLE 1:

Powder properties of the polymer particles recovered (Part 1)

| | Ex. 1 | Ex. 2 | Ex. 3 | Ex. 4 | Comp. Ex. 1 | Comp. Ex. 2 | Comp. Ex. 3 | Comp. Ex. 4 | Ex. 5 | Comp. Ex. 5 | Comp. Ex. 6 |
|---|---|---|---|---|---|---|---|---|---|---|---|
| Shape of particles | Spherical | Spherical | Spherical | Spherical | Irregular in half amount | Irregular in about one fifth amount | Spherical | Agglomerated particles in half amount | Spherical | Irregular in half or more amount | Irregular in half amount |
| Mean diameter (microns) | 250 | 255 | 255 | 255 | 215 | 245 | 250 | 290 | 255 | 240 | 180 |
| Particle size distribution (%) ≧500 microns | 1.7 | 2.8 | 2.1 | 2.2 | 1.7 | 2.0 | 1.5 | 4.7 | 3.8 | 6.8 | 0.5 |
| 500–250 microns | 48.0 | 49.7 | 48.8 | 49.8 | 38.5 | 46.0 | 48.4 | 58.3 | 47.2 | 40.8 | 31.3 |
| 250–150 microns | 28.1 | 30.4 | 29.6 | 29.9 | 28.8 | 27.8 | 29.2 | 25.3 | 30.7 | 24.4 | 24.7 |
| 150–105 microns | 9.9 | 8.9 | 9.4 | 8.5 | 9.6 | 9.3 | 8.3 | 6.3 | 9.3 | 8.1 | 9.7 |
| 105–53 microns | 6.8 | 5.0 | 6.5 | 5.8 | 4.7 | 6.3 | 6.3 | 3.6 | 4.1 | 6.2 | 9.0 |
| <53 microns | 5.5 | 3.2 | 4.0 | 3.8 | 16.7 | 8.6 | 6.3 | 1.8 | 3.9 | 13.7 | 24.8 |
| Bulk density (g/cc) | 0.450 | 0.469 | 0.464 | 0.458 | 0.350 | 0.421 | 0.442 | 0.365 | 0.465 | 0.314 | 0.337 |
| Anti-blocking property (% crumbling of cake) | 87.2 | 90.5 | 90.1 | 91.0 | 57.8 | 79.2 | 89.0 | 81.4 | 90.0 | 42.7 | 48.1 |
| Fluidity (Number of impulses) | 1 | 1 | 1 | 1 | 13 | 3 | 1 | 10 | 1 | 25 | 20 |
| Angle of repose (degree) | 28.8 | 27.6 | 27.6 | 27.9 | 37.5 | 32.4 | 29.4 | 36.6 | 28.0 | 38.4 | 39.0 |
| Dustiness of powder (%) | 0.17 | 0.12 | 0.12 | 0.12 | 0.85 | 0.39 | 0.21 | 0.03 | 0.17 | 0.68 | 1.4 |

Powder properties of the polymer particles recovered (Part 2)

| | Comp. Ex. 7 | Ex. 6 | Comp. Ex. 8 | Ex. 7 | Comp. Ex. 9 | Ex. 8 | Comp. Ex. 10 | Ex. 9 | Comp. Ex. 11 | Ex. 10 | Comp. Ex. 12 |
|---|---|---|---|---|---|---|---|---|---|---|---|
| Shape of particles | Almost agglomerated | Spherical | Destroyed or irregular in half or more amount | Spherical | Spherical | Spherical | Destroyed in a quarter amount | Nearly spherical | Irregular in half amount | Spherical | Spherical |
| Mean diameter (microns) | | 260 | 170 | 250 | 245 | 980 | 1200 | 240 | | 170 | 170 |
| Particle size distribution (%) ≧500 microns | | 3.5 | 0.2 | 2.4 | 2.9 | 95.1 | 86.9 | 1.3 | | 0 | 0 |
| 500–250 microns | | 50.9 | 27.5 | 47.9 | 45.4 | 4.9 | 3.8 | 46.6 | | 21.3 | 19.2 |
| 250–150 microns | | 27.5 | 27.8 | 32.3 | 33.5 | 0 | 1.0 | 29.4 | | 36.3 | 39.3 |
| 150–105 microns | | 8.5 | 8.5 | 8.7 | 9.3 | 0 | 0.4 | 9.7 | | 18.4 | 15.7 |
| 105–53 microns | | 4.9 | 12.4 | 5.8 | 5.5 | 0 | 0.4 | 6.6 | | 8.4 | 7.5 |
| <53 microns | not measured | 4.7 | 29.6 | 2.9 | 3.4 | 0 | 7.5 | 6.4 | not measured | 15.6 | 18.3 |
| Bulk density (g/cc) | | 0.419 | 0.294 | 0.475 | 0.470 | 0.431 | 0.427 | 0.424 | | 0.448 | 0.452 |
| Anti-blocking property (% crumbling of cake) | | 86.3 | 33.8 | 93.7 | 93.3 | 98.7 | 88.1 | 89.5 | | 91.2 | 90.8 |
| Fluidity (Number of impulses) | | 2 | 20 | 1 | 0 | >50 | >50 | 2 | | 1 | 1 |
| Angle of repose (degree) | | 30.4 | 40.2 | 27.4 | 27.2 | 24.7 | 30.3 | 29.8 | | 30.6 | 30.9 |
| Dustiness of powder (%) | | 0.20 | 1.6 | 0.10 | 0.09 | 0 | 0.62 | 0.16 | | 0.23 | 0.24 |

Powder properties of the polymer particles recovered (Part 3)

| Ex. 11 | Ex. 12 | Comp. Ex. 13 | Comp. Ex. 14 | Comp. Ex. 15 | Ex. 14 | Comp. Ex. 16 | Comp. Ex. 17 | Ex. 15 |

TABLE 1:-continued

| | | Ex. 16 | Comp. Ex. 18 | Ex. 17 | Comp. Ex. 19 | Ex. 18 | Comp. Ex. 20 | Ex. 19 | Comp. Ex. 21 | Ex. 20 | Comp. Ex. 22 |
|---|---|---|---|---|---|---|---|---|---|---|---|
| Shape of particles | | Spherical | Spherical | Spherical | Irregular in half amount | Spherical | Irregular in half amount | Spherical | Agglomerated particles in half amount | Almost agglomerated | Spherical |
| Mean diameter (microns) | | 280 | 280 | 285 | 220 | 280 | 230 | 285 | 325 | | 285 |
| Particle size distribution (%) | ≧500 microns | 2.3 | 1.8 | 1.8 | 4.2 | 2.5 | 1.6 | 2.5 | 8.5 | not measured | 2.1 |
| | 500–250 microns | 57.6 | 59.2 | 61.2 | 37.7 | 55.8 | 42.8 | 59.7 | 63.8 | | 61.9 |
| | 250–150 microns | 21.1 | 24.8 | 24.9 | 26.1 | 21.6 | 23.5 | 24.6 | 19.6 | | 24.2 |
| | 150–105 microns | 5.0 | 5.6 | 5.0 | 5.0 | 4.7 | 3.7 | 5.2 | 4.7 | | 4.5 |
| | 105–53 microns | 2.8 | 3.0 | 3.5 | 2.1 | 2.7 | 2.4 | 3.3 | 2.5 | | 3.8 |
| | <53 microns | 11.2 | 5.6 | 3.6 | 24.9 | 12.7 | 26.0 | 4.7 | 0.9 | | 3.5 |
| Bulk density (g/cc) | | 0.486 | 0.500 | 0.505 | 0.452 | 0.475 | 0.447 | 0.493 | 0.452 | | 0.509 |
| Anti-blocking property (% crumbling of cake) | | 0 | 0 | 0 | 8 | 0 | 9 | 0 | 10 | These powders don't turn into any cake. | 0 |
| Fluidity (Number of impulses) | | 28.9 | 27.5 | 27.0 | 33.2 | 28.8 | 35.3 | 28.2 | 35.2 | not measured | 27.2 |
| Angle of repose (degree) | | | | | | | | | | | |
| Dustiness of Powder (%) | | 0.31 | 0.22 | 0.17 | 1.0 | 0.35 | 1.5 | 0.15 | 0.09 | | 0.21 |

Powder properties of the polymer particles recovered (Part 4)

| | | Ex. 16 | Comp. Ex. 18 | Ex. 17 | Comp. Ex. 19 | Ex. 18 | Comp. Ex. 20 | Ex. 19 | Comp. Ex. 21 | Ex. 20 | Comp. Ex. 22 |
|---|---|---|---|---|---|---|---|---|---|---|---|
| Shape of particles | | Spherical | Spherical | Spherical | Destroyed or irregular in half or more amount | Spherical | Destroyed in a quarter amount | Spherical | Irregular in half amount | Spherical | Spherical |
| Mean diameter (microns) | | 280 | 280 | 290 | 220 | 970 | 1200 | 240 | | 170 | 175 |
| Particle size distribution (%) | ≧500 microns | 2.0 | 2.6 | 3.0 | 0.7 | 94.6 | 85.1 | 0.6 | not measured | 0 | 0 |
| | 500–250 microns | 59.9 | 59.7 | 60.8 | 41.4 | 5.4 | 4.2 | 46.4 | | 23.6 | 24.0 |
| | 250–150 microns | 25.1 | 25.2 | 19.3 | 23.9 | 0 | 1.1 | 26.9 | | 34.5 | 34.9 |
| | 150–105 microns | 5.4 | 5.0 | 6.1 | 3.7 | 0 | 0.4 | 7.7 | | 12.1 | 10.7 |
| | 105–53 microns | 2.8 | 3.2 | 3.7 | 3.8 | 0 | 0.3 | 4.8 | | 10.3 | 12.3 |
| | <53 microns | 4.8 | 4.3 | 7.1 | 26.5 | 0 | 8.9 | 13.6 | | 19.5 | 18.1 |
| Bulk density (g/cc) | | 0.497 | 0.495 | 0.481 | 0.451 | 0.488 | 0.473 | 0.492 | | 0.496 | 0.491 |
| Anti-blocking property (% crumbling of cake) | | 0 | 0 | 0 | 10 | >50 | >50 | 2 | Those powders don't turn into any cake. | 2 | 2 |
| Fluidity (Number of impulses) | | 27.9 | 27.6 | 28.6 | 34.9 | 25.5 | 31.7 | 29.4 | | 28.1 | 27.9 |
| Angle of repose (degree) | | | | | | | | | | | |
| Dustiness of powder (%) | | 0.24 | 0.22 | 0.26 | 1.5 | 0 | 0.89 | 0.34 | | 0.25 | 0.24 |

Methods for Measuring Powder Properties in Table 1

1. Particle size distribution:

Wet sieve method was used. Drying condition after wet sieving was at 105° C. for 1 hour.

2. Bulk density:

Conventional method was used.

3. Anti-blocking property:

The cake was prepared by compression of 30 g of particles at 25 Kg/cm²G for 2 min. at room temperature. The obtained cake was put on a sieve, then vibrated reciprocally in 60 cycle/sec. with an amplitude of 1 mm and the anti-blocking property defined as percent of the cake crumbled during the vibration for 200 sec. was observed.

4. Fluidity:

The particles were filled up in a hopper having dimensions of 5 mm outlet diameter, 60 mm height and 45° hopper angle. The number of impulses, each having a definite strength added to the hopper until total amount of powder in the hopper flowed down through the outlet was counted.

5. Angle of repose:

Conventional method was used.

6. Dustiness of powder:

15 g of resin powder was charged into a chamber having dimensions of 40 mm diameter and 120 mm height, at the bottom of which a glass fibre filter with 20μ apertures was provided to serve as an air distributor. Through the glass fibre filter at the bottom of the chamber, was air supplied at the rate of 4.0 cm/sec. based on empty chamber to fluidize the powder in the chamber. Thus, fine powders escaping from an air outlet located on the top of the chamber were collected with a glass fibre filter having 2μ apertures. The amount of escaped powder collected during 5 minutes after the beginning of supplying air was represented by fraction per the resin powder charged.

What is claimed:

1. A method for coagulating a latex of a synthetic polymer at a coagulated latex particle formation temperature at which pluralities of polymer particles coagulate in droplets of the latex to form coagulated latex particles, without causing agglomeration of the coagulated latex particles to form substantially spherical particles, the method which comprises coagulating said latex by dispersing substantially spherical droplets of it, the droplets having a size distribution such that not more than 20% have a diameter smaller than 53 microns and the remainder have a diameter of 2 mm or less, into a coagulating atmosphere selected from the group consisting of: (i) a gaseous coagulant; and (ii) a liquid coagulant in the form of a mist comprising liquid drops having diameters such that the terminal settling velocity of the drops under free-falling conditions is in accordance with Stokes' Law, said coagulation atmosphere being maintained at the coagulated latex particle formation temperature and being contained in a vertically disposed coagulation chamber having side walls with inner surfaces, while causing water to flow downward over the inner surfaces as a liquid recovery medium, the water being maintained at the coagulated latex particle formation temperature to recover the coagulated latex particles having a substantially spherical shape, contact being maintained between the droplets of latex and the coagulating atmosphere for a period between 0.6 to 3 seconds effective to permit said droplets to absorb about 0.36 to 8% by weight of coagulant based on the weight of the polymer to stabilize said coagulated latex particles.

2. The method of claim 1 in which said latex is dispersed into the coagulating atmosphere by a nozzle at a rate of 5.7 to 20 liters/min M² of horizontal cross-section area of the coagulation chamber.

3. The method of claim 1 in which said latex is dispersed into the coagulating atmosphere by a centrifugal disc a a rate of 0.5 to 2.0 liters/min M² of horizontal cross-section area of the coagulation chamber.

4. The method of claim 1 in which said polymer latex is the product of the polymerization of 20 to 80 parts by weight of monomers consisting essentially of 0 to 50 weight percent acrylic ester, 0 to 100 weight percent methacrylic ester, 0 to 90 weight percent aromatic vinyl compound and 0 to 90 weight cyano vinyl compound in the presence of 20 to 80 parts by weight of an elastomer latex consisting essentially of 0 to 50 weight percent styrene and 50 to 100 weight percent butadiene, in which said coagulated latex particle formation temperature is between the Vicat softening temperature of said polymer and 30° C. below the Vicat softening temperature.

5. The method of claim 1 in which said polymer latex is the product resulting from the mixing of 0 to 50 parts by weight of a graft copolymer (A) which is the product of the polymerization of 10 to 90 parts by weight of one or more monomers selected from aromatic vinyl compound, methacrylic ester, acrylic ester or cyano vinyl compound in the presence of 10 to 90 parts by weight of butadiene elastomer latex consisting of 0 to 50 weight percent of styrene and 50 to 100 weight percent of butadiene and 50 to 100 parts by weight of a polymer (B) which is the product of the copolymerization of monomers containing 0 to 70 mol percent of α-methylstyrene and 30 to 100 mol percent of one or more monomers selected from aromatic vinyl compound, methacrylic ester, acrylic ester, acrylic acid or cyano vinyl compound, in which said coagulated latex particle formation temperature is between 70° C. and the Vicat softening temperature of said polymer.

6. The method of claim 1 in which said coagulant is supplied in an amount of from 0.4 to 10 weight percent based on the weight of polymeric latex dispersed.

* * * * *